United States Patent Office 2,925,002
Patented Feb. 16, 1960

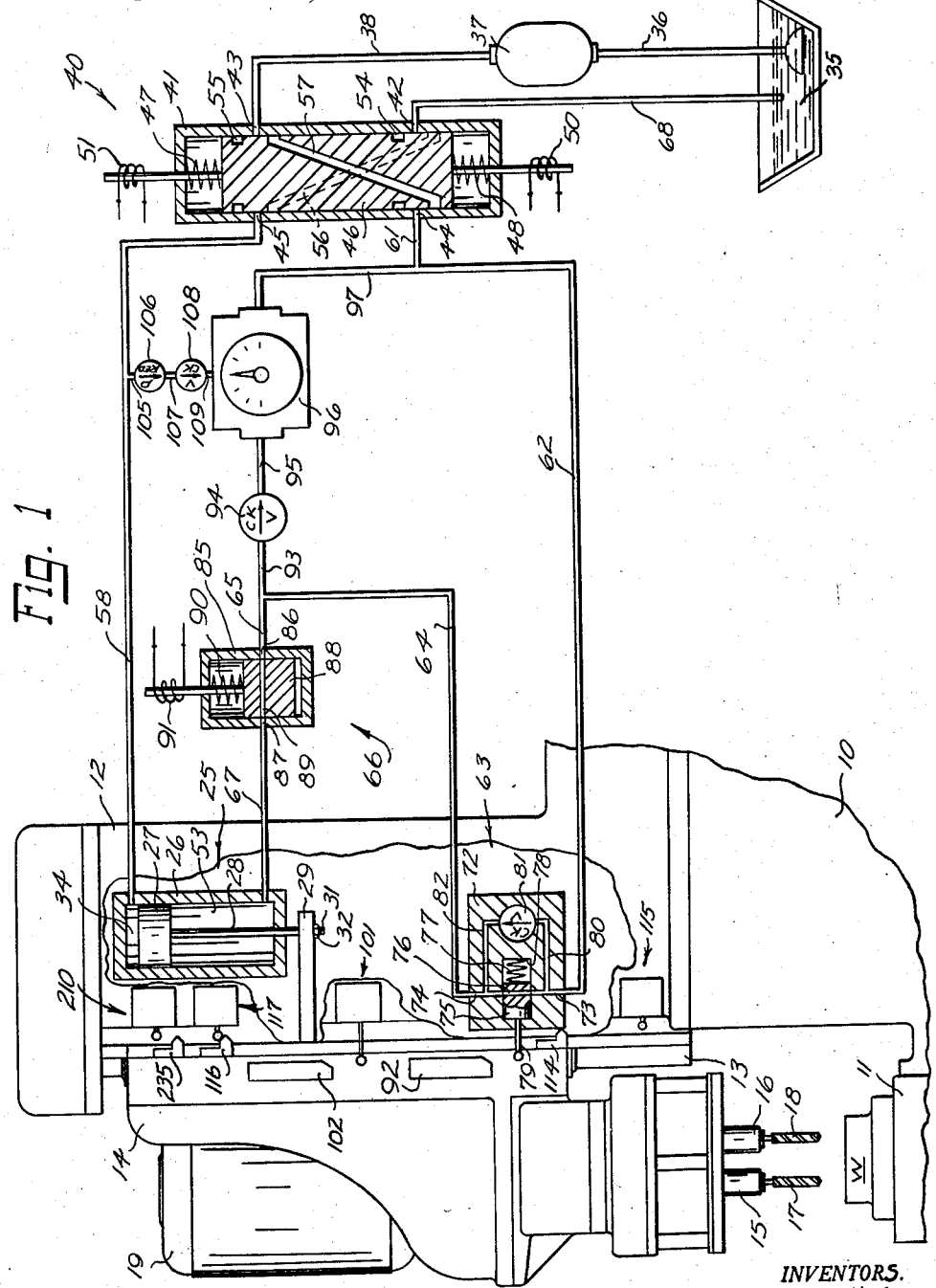

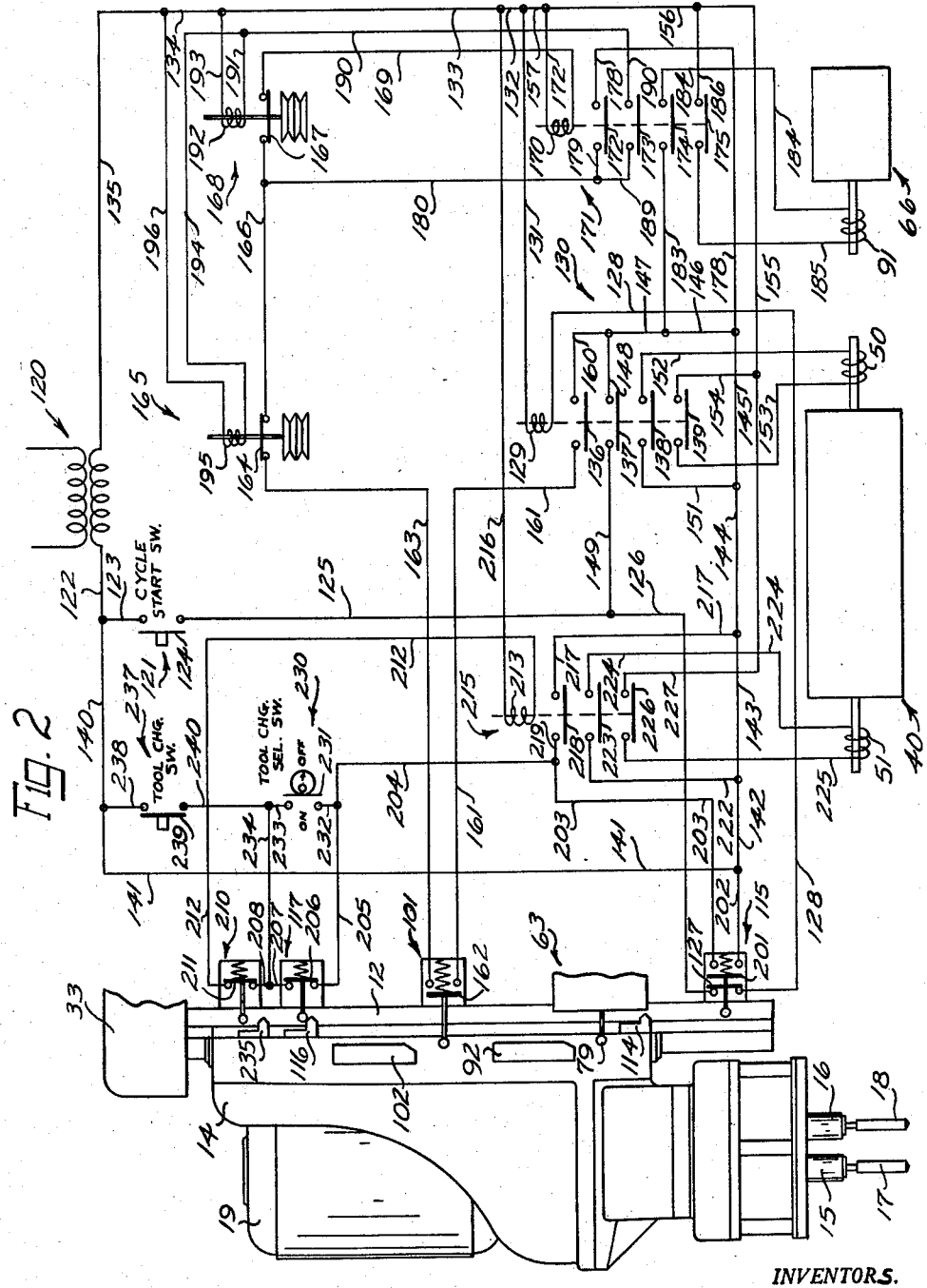

2,925,002
CONTROL SYSTEM

John R. Finley, West Allis, and Robert J. Sem, West Milwaukee, Wis., assignors to Kearney & Trecker Corporation, West Allis, Wis., a corporation of Wisconsin Application August 12, 1957, Serial No. 677,523

16 Claims. (Cl. 77—32.3)

This invention relates to machine tools and more particularly to a control system for advancing or feeding a machine tool member to perform a cutting operation.

While capable of being used with other movable members of machine tools, it is particularly adapted for use with drilling machines where it is advantageous to break the chips produced by the drilling tools without withdrawing the tool from the work.

One of the objects of the present invention is to provide a control system for a movable member of a machine tool that operates to effect a rapid advancement of the movable member toward the workpiece and reduces the rate of advancement to a feed rate for a work operation.

Another object of the present invention is to provide a control system for a movable member of a machine tool which is automatically operable to periodically interrupt the feeding advancement of the member.

Another object of the present invention is to provide a control system for a drill tool member whereby the feeding of the member may be interrupted for short periodic intervals to effect a breaking of the chips produced by the tools without withdrawing the tool from the work.

Other features and advantages of the present invention will become apparent from the following specification and may be achieved by the control system described in connection with the accompanying drawings illustrating the invention in which:

Figure 1 is a fragmentary view of a machine tool showing a drilling head thereon for advancement towards a workpiece with a schematic showing of the hydraulic electrical control system employed; and, Fig. 2 is a diagrammatic illustration of the electrical circuit employed with the hydraulic system shown in Fig. 1.

Referring now to the drawings and to Fig. 1 in particular, the invention is shown in connection with a drilling machine having a base 10 upon which a work supporting table 11 is slidably mounted in the usual manner for transverse movement. Uprising from the base 10 is a column 12 having vertical guideways 13 on which is supported a drill head 14 for vertical reciprocal movement towards or away from a workpiece W carried on the table 11. Rotatably supported in the head 14 are a pair of spindles 15 and 16 in which a pair of drills 17 and 18 are mounted in the usual manner. Power for rotating the spindles 15 and 16 is obtained from an electric motor 19 secured to the head 14 and operably connected to drive the spindle through the usual gear transmission (not shown).

To reciprocate the head 14 on the column 12 there is provided a fluid actuator, schematically shown in Fig. 1 and generally identified by the reference numeral 25. The actuator 25 comprises a cylinder 26 which is secured within the column in the usual manner. A piston 27 is reciprocally supported within the cylinder 26 and is provided with a piston rod 28 which extends outwardly of the cylinder. The piston rod 28 is operably connected to the drill head 14 by means of a bracket 29. The bracket 29 is secured to the head 14 and threadedly receives the free end 31 of the piston rod 28 which is secured therein by a lock nut 32.

To advance the head towards the workpiece W fluid pressure is applied to a chamber 34 at the head side of the piston 27. To this end, fluid from a reservoir 35 is supplied to the actuator 25 through a supply line 36 connected to the inlet side of a pump 37. From the pump, fluid under pressure is directed through a line 38 to a distribution valve, generally denoted at 40. The valve 40 serves to direct the fluid pressure to one side or the other of the piston 27 of the actuator 25.

The valve 40 comprises a valve body 41 having four ports 42, 43, 44 and 45 therein. A movable plunger 46 is contained within the valve body for movement either upwardly or downwardly from a central or neutral position. The plunger is normally maintained in the central position by a pair of springs 47 and 48 interposed between the ends of the plunger 46 and the interior end surfaces of the valve body 41. The plunger 46 is actuated downwardly by energizing a solenoid 50 operably connected to move the plunger. In the downward position, the plunger will direct fluid pressure to the chamber 34 of the actuator 25 to effect advancement of the drill head 14. To move the plunger 46 to an upward position in the valve body 41, a solenoid 51 is operably connected thereto and when energized effects movement of the plunger. In the upward position the plunger 46 will direct fluid pressure to a chamber 53 on the rod side of the piston 27 of the actuator 25 to effect a retraction of the drill head 14.

To selectively direct fluid pressure to the actuator 25, the plunger 46 of the distribution valve 40 is provided with a pair of cannelures 54 and 55 and a pair of passages 56 and 57. The cannelures 54 and 55 serve to connect the ports 42 and 44 together, and the ports 43 and 45 together, respectively, when the plunger 46 is moved to a position downwardly of the neutral position. The passages 56 and 57 serve to connect the ports 42 and 45 together, and the ports 43 and 44 together when the plunger is moved to a position upwardly of the neutral position. The port 45 of the valve 40 is connected to the actuator 25, so as to be in communication with the chamber 34, by a line 58. The port 44 of the valve 40 is connected to the actuator 25, so as to be in communication with the chamber 53 on the rod side of the piston 27. The connection, as shown in Fig. 1, is established through a line 61, a line 62, a plunger actuated stop valve or blocking valve generally denoted at 63, a line 64, a line 65, a solenoid actuated blocking valve generally denoted at 66, and a line 67. The port 42 of the valve 40 serves as an exhaust port and is connected to the reservoir 35 by a line 68.

The plunger operated valve 63 comprises a valve housing 72 having two internal passages 73 and 74. The passages 73 and 74 are in communication with the lines 62 and 64, respectively. Within the valve housing 72 a plunger 75 is movably supported and is provided with a passage 76 which serves to connect the internal passages 73 and 74 together when the plunger is in its normal outward position. A spring 77 is interposed between the lower end of the plunger and the base of a bore 78 in which the plunger is mounted and serves to normally bias the plunger outwardly so that the passage 76 connects the passages 73 and 74 together. A rod 79 is secured to the outer end of the plunger 75 and extends outwardly of the valve housing 72 and serves, when actuated, to move the plunger inwardly into the bore 78 to block communication between the passages 73 and 74. To permit a flow of fluid pressure through the valve 63, from the line 62 to the line 64, whenever the plunger 75 has been moved inwardly to disconnect the passages 73 and 74, a secondary fluid circuit has been provided within the valve. The secondary circuit comprises an internal passage 80 having one end connected to the passage 73 and having its opposite end connected to the inlet side of a check valve 81, and a second passage 82 having one end connected to the outlet side of the check valve 81 and having its opposite end in communication with the passage 74. Thus, whenever the plunger 75 has been moved inwardly, fluid pressure may still pass through the valve 63 in a flow direction from the line 62 to the line 64 via the passage 73, the passage 80, the check valve 81, the passage 82 and the passage 74.

The solenoid actuated valve 66 comprises a valve housing 85 having a pair of ports 86 and 87 to which the lines 65 and 67, respectively, are connected. Within the valve housing 85 a plunger 88 is movably supported and is provided with a passage 89 which serves to connect the ports 86 and 87 together when the plunger is in its normal inward position, as shown in Fig. 1. A spring 90 interposed between the top of the plunger and the top inner surface of the valve housing 85 serves to normally bias the plunger inwardly to connect the ports 86 and 87 of the valve housing together. A solenoid 91 is operably connected to the plunger 88 in the usual manner, and when energized will effect movement of the plunger upwardly within the valve housing 85 to block the ports 86 and 87.

Thus, to advance the drill head 14 at a rapid rate towards the workpiece W, the solenoid 50 of the valve 40 may be energized to effect positioning of the plunger 46 downwardly. Fluid pressure in the line 38 will then pass through the valve 40 via port 43, the cannelure 55 and out through the port 45 into the line 58 by which means it passes into the chamber 34 of the actuator 25. Fluid in the chamber 53 of the actuator 25 will be exhausted therefrom into the line 67. From the line 67 the exhaust fluid will enter port 87 of the valve 66 and pass through the valve via the passage 89 in the plunger 88 and port 86 into the line 65. From the line 65 exhaust fluid will continue on through the line 64 and pass through the valve 63 via the passage 74, the aligned passage 76 in the plunger 75, and out through the passage 73 into the line 62. From the line 62 the exhaust fluid will continue on into the line 61 and enter port 44 of the valve 40, and by means of the cannelure 54 in the plunger 46 and the port 42 and the return line 68 will be returned to the reservoir.

However, just prior to the engagement of the drills 17 and 18 with the workpiece W it is desired that the rate at which the drill head is advanced be reduced to a feed rate. To this end, the valve 63 is positioned on the column 12 in a manner that an adjustable dog 92, carried on the drill head 14 engages the rod 79 of the valve 63 to move the plunger 75 inwardly to move the passage 76 out of communication with the passages 73 and 74. Thus, fluid being exhausted from the chamber 53 is no longer free to return to the reservoir via the valve 63. A speed control circuit is therefore provided which serves to meter the flow of the exhaust fluid from the chamber 53 of the actuator 25 and return it to the reservoir 35. The speed control circuit comprises a line 93 having one end connected to the line 65 and having its opposite end connected to the inlet side of a check valve 94. The outlet side of the check valve 94 is in communication with a line 95 which in turn is connected to the inlet side of a manually adjustable rate control metering valve 96. The outlet side of the metering valve is connected to a line 97 which is connected to the line 61. Thus, when the valve 63 is closed by the dog 92, the exhaust fluid from the chamber 53 of the actuator 25 will flow from the line 65 through the metering circuit just described, and the rate at which the fluid is permitted to return to the reservoir will be controlled by the valve 96.

During a drilling operation the material removed by the drills 17 and 18 is usually in the form of long, curled chips which interfere with the proper functioning of the tools and with the operation of the machine and which are dangerous to the operator of the machine. To break the chips, without withdrawing the tools from the work, the valve 66 is periodically closed and opened during the feed advancement of the drill head 14. To this end, an electrical switch 101 carried on the column 12 is positioned so as to be actuated by an adjustable dog 102 mounted on the head 14. We prefer that the dog 102 be positioned to actuate the switch 101 at the time that the dog 92 engages the rod 79 of the valve 63. The switch 101 when actuated establishes an electrical circuit, to be subsequently described, to the solenoid 91 of the valve 66 which will effect a periodic energization and de-energization of the solenoid. The periodic energization and de-energization of the solenoid will result in a periodic closing and opening of the valve 66 to block the escape of exhaust fluid from the chamber 53 of the actuator 25. Thus, the feed advancement of the head 14 will be periodically interrupted according to the time interval between energization and de-energization of the solenoid 91. The periodic interruptions of the feed advancement of the head is effective in breaking the chips formed by the drills 17 and 18 in a drilling operation.

During the time that the valve 66 is actuated to interrupt the feeding advancement of the drill head 14 pressure will build up in the chamber 53 and the line 67. At the same time no pressure will exist in the speed control circuit and the metering valve 96 would close. With this condition, opening of the valve 66 would result in a sudden "jump" or advancing movement of the head. To prevent this "jump" from occurring the valve 96 is maintained open by a pilot connection in the valve with fluid pressure for the pilot being obtained from the line 58. As schematically shown in Fig. 1, fluid pressure for the pilot of the valve 96 is obtained from a pilot line 105 connected to the line 58 and to the inlet side of a pressure reducing valve 106. From the pressure reducing valve 106 fluid pressure will be directed to the pilot of the valve 96 via a line 107, a check valve 108 and a line 109.

For a clear understanding of the invention a complete cycle of operation will be given. In this respect, as shown in Fig. 1, the drill head and the various valves and switches are shown in their normal position. To initiate a cycle of operation the operator presses a cycle start switch, to be subsequently described in conjunction with the electrical circuit, to establish an electrical circuit to energize the solenoid 50 of the valve 40 to move the plunger 46 downwardly. Fluid pressure from the pump 37 will flow through the valve 40 via the port 43, the cannelure 55 and the port 45 into the line 58 and be directed thereby to the chamber 34 of the actuator 25. Fluid pressure in the chamber 34 will advance the drill head 14 towards the workpiece W at a rapid rate. Fluid in the chamber 53 of the actuator 25 will be returned to the reservoir 35 via the line 67, the normally open valve 66, the line 65, the line 64, and will pass through the normally open valve 63, via the passages 74, 76 and 73 into the line 62. From the line 62 the exhaust fluid will flow into the line 61 and pass through the valve 40 via the ports 44, the cannelure 54 and the port 42 into the return line 68 to the reservoir 35.

Just prior to the engagement of the drills 17 and 18 with the workpiece W the dog 92 will contact the rod 79 of the valve 63 to move the plunger 75 thereof inwardly to effectively block the flow of exhaust fluid therethrough. The exhaust fluid then will be directed to the port 44 of the valve 40 via the line 93, the check valve 94, the line 95, the metering valve 96, the line 97 and the line 61. The flow of exhaust fluid through the metering valve 96 will be restricted to a predetermined rate thus reducing the rate of advancement of the drill head 14 to a feed rate.

Simultaneously with the engagement of the dog 92 with the rod 79 of the valve 63, the dog 102 adjustably secured to the head 14 actuates the switch 101, mounted in position on the column 12, to a closed condition. The switch 101 upon being closed completes an electrical circuit, to be described, to the solenoid 91 of the valve 66. Energization of the solenoid 91 effects movement of the plunger 88 upwardly to block the flow of exhaust fluid from the chamber 53 of the actuator 25 thereby stopping the feed advancement of the drill head 14. The electrical circuit to the solenoid is such that the solenoid is energized for a predetermined time period and then de-energized for a predetermined time period. This action is continued for the entire feed advancement travel of the drill head. Thus, the feed advancement of the drill head is periodically interrupted for relatively short intervals. It is therefore apparent that the material removed by the drills 17 and 18 will be relatively small chips as compared to the chips formed by drills that are continuously advanced.

When the drill head 14 has reached its limit of advancement a dog 114 adjustably secured on the drill head 14 actuates a switch 115 adjustably secured on the column 12. The switch 115 upon being actuated interrupts an electrical circuit to the solenoid 50 of the valve 40 and to the solenoid 91 of the valve 66 to de-energize the solenoids returning the plunger 46 and 88, respectively, to their normal positions. The switch 115 upon being actuated, also establishes an electrical circuit to the solenoid 51 of the valve 40 to energize the solenoid to move the plunger 46 upwardly.

Fluid pressure will now flow from the line 38 through the valve 40 via the port 43, the passage 57, the port 44 into the line 61. From the line 61 fluid pressure will be directed by the line 62 to the valve 63. Since the plunger 75 of the valve 63 is maintained inwardly by the dog 92, fluid pressure will pass through the valve via the passages 73 and 80, the check valve 81, and the passages 82 and 74 into the line 64. The fluid pressure will continue to flow through the line 64 and the line 65 and pass through the now open valve 66 and by the line 67 will enter the chamber 53 of the actuator 25 to retract the head 14 at a rapid rate. Fluid in the chamber 34 of the actuator will be returned to the reservoir 35 via the line 58, the valve 40 via the port 45, the passage 56 and the port 42 into the return line 68.

When the drill head 14 has been retracted to its normal start position a dog 116 on the drill head 14 will contact a switch 117 which when contacted will be actuated from a normally closed condition to an open condition to interrupt the electrical circuit to the solenoid 51 of the valve 40 to de-energize the solenoid. The plunger 46 of the valve 40 will then return to its neutral position blocking the flow of fluid pressure through the valve to complete a cycle of operation.

When the drill head 14 is retracted, the dog 92 will be moved out of contact with the rod 79 of the valve 63 permitting the plunger 75 thereof to be spring returned to its normally open position. Also, the dog 102 will be moved out of engagement with the switch 101 to permit the switch to return to its normally open position.

Reference is now made to Fig. 2 which illustrates the electrical circuits used in conjunction with the hydraulic circuit, of Fig. 1, for automatically controlling the advancement and retraction of the drill head 14 in a complete operational cycle.

The electrical circuit shown is energized by the current obtained from a transformer 120 wired to a source of single phase current in the usual manner.

To initiate a cycle of operation the operator depresses a cycle start switch 121. Upon actuation of the switch 121 current flows from the transformer 120 through conductors 122 and 123 to the switch 121. The current flows through a now closed contact 124 of the switch 121 and conductors 125 and 126 to the switch 115. From the switch 115 current flows through a normally closed contact 127 of the switch 115 to a conductor 128 and thence through a coil 129 of a relay 130 and through conductors 131, 132, 133, 134 and 135 back to the secondary of the transformer 120 to complete the circuit. Current flowing through the coil of the solenoid 129 of the relay 130, energizes the relay, closing the contacts 136, 137, 138 and 139 therein. Current will now flow to the coil of the solenoid 129 of the relay 130 from the transformer 120 through the conductor 122 and by conductors 140, 141, 142, 143, 144, 145, 146, 147 and 148 through the now closed contact 137 of the relay 130. From the closed contact 137 the current will continue to flow through a conductor 149 to the conductor 126 and pass through the switch 115 by means of the normally closed contact 127 therein, to the conductor 128 from whence it will flow through the coil of the solenoid 129 of the relay 130. From the coil of the solenoid 129 current will be returned to the secondary of the transformer by the conductors 131, 132, 133, 134 and 135 to complete the circuit. With the holding circuit just described the cycle start switch 121 will be shunted so that the solenoid 129 of the relay 130 will remain energized when the switch 121 is released. Simultaneously, current will also flow from the conductor 144 through a conductor 151 through the now closed contact 138 of the relay 130 to a conductor 152. Current will continue from the conductor 152 through the coil of the solenoid 50 of the distribution valve 40 and by means of conductor 153, closed contact 139, conductors 154, 155, 156 and 157 to the conductor 132 and thence to the secondary of the transformer 120 to complete the circuit. Current flowing in the coil of the solenoid 50 of the valve 40 will condition the valve to direct fluid pressure to the actuator 25 to advance the drill head 14 at a rapid rate, as previously described.

When the drill head 14 has been advanced to a position where the dog 102 actuates the normally open switch 101 to a closed position an electrical circuit will have been established to energize the solenoid 91 of the valve 66. Upon closing of the switch 101 current will flow from the current carrying line 147 and pass through a conductor 160, the closed contact 136 of the relay 130, a conductor 161, through the now closed contact 162 of the switch 101, a conductor 163, through a closed contact 164 of a normally closed relay 165, a conductor 166, through a closed contact 167 of another normally closed relay 168, and a conductor 169, through the coil of a solenoid 170 of a relay 171. From the coil of the solenoid 170 current returns to the secondary of the transformer 120 via a conductor 172 and the conductors 157, 132, 133, 134 and 135. Current flowing through the coil of the solenoid 170, energizes the relay 171, closing the contacts 172, 173, 174 and 175 therein. When the contact 172 in the relay 171 is closed current will flow from the hot line 145 through a conductor 178, through the closed contact 172, a conductor 179, a conductor 180, the conductor 166, the closed contact 167 of the relay 168, the conductor 169, through the coil of the solenoid 170 of the relay 171. From the coil of the solenoid 170 current will return to the transformer 120 via the conductors 172, 157, 132, 134 and 135 to complete the circuit. The secondary circuit to the coil of the solenoid 170 of the relay 171 serves as a holding circuit to maintain the relay energized when the contact 164 of the relay 165 is opened.

Closing of the contacts within the relay 171 also establishes a circuit to the solenoid 91 of the valve 66. In this respect, current will flow from the current carrying conductor 146 through a conductor 183, the closed contact 174 of the relay 171, a conductor 184 through the coil of the solenoid 91 of the valve 66. From the coil of the solenoid 91 current will return to the secondary of the transformer 120 via a conductor 185, the closed contact 175 of the relay 171, a conductor 186 and the conductors 156, 157, 132, 133, 134 and 135. The current passing through the coil of the solenoid 91 of the valve 66, energizes the solenoid, to close the valve.

The valve 66, upon closing, interrupts the discharge of exhaust fluid from the chamber 53 of the head actuator 25 to stop the feed advancement of the drill head 14, as previously described. However, since it is desired that the advancement of the drill head be stopped only for a relatively short period and at reoccurring intervals, the solenoid 91 of the valve must be de-energized to allow the valve to open. The periodic energization and de-energization of the solenoid must be automatic. This action is accomplished by means of the relays 165 and 168. The relay 165 is of the type that is normally closed and when the solenoid thereof is energized operates to immediately open the contact therein, and when the solenoid thereof is de-energized will return to its normal closed position after a selected predetermined time. The relay 168, on the other hand, is of the type that is normally closed and when the solenoid thereof is energized operates to open the contact therein after a selected predetermined time and when the solenoid is de-energized return to its normally closed condition immediately.

For the purpose of description, an arbitrary two second feed interval with a one second stop interval will be assumed to be the desired operational cycle that the head 14 be operated at during a work operation. Thus, the timer of the relay 165 is set for two seconds, since this relay controls the feed interval of the head 14. The timer of the relay 168 will be set for a one second time interval, since this relay controls the time interval that the head 14 will be stopped.

To automatically effect periodic operation of the valve 66, current from the maintaining circuit of the relay 171 flows from the hot conductor 179 through a conductor 189, the closed contact 173 of the relay 171, a conductor 190, a conductor 191 through the coil of a solenoid 192 of the relay 168. From the coil of the solenoid 192 current returns to the transformer 120 via a conductor 193 and the conductors 134 and 135 to complete the circuit. Current will also flow from the conductor 190 through a conductor 194, the coil of a solenoid 195 of the relay 165 and return to the transformer 120 via a conductor 196 and the conductor 135 to complete the circuit. Current passing through the coils of the solenoids 192 and 195 of the relays 168 and 165, respectively energizes the solenoids, to effect operation of them. When the relay 165 is energized the contact 164 therein will be immediately opened to break the primary energizing circuit to the coil of the solenoid 170 of the relay 171. However, the maintaining circuit to the solenoid 170 is still uninterrupted due to the time to open function of the relay 168. After the predetermined time set, which is one second, for the relay 168 to open has expired, the closed contact 167 in the relay 168 will open and the relay 171 will be de-energized, opening the contacts therein. When the contacts of the relay 171 are in the open position the solenoid 91 of the valve 66 will be de-energized allowing the plunger 88 within the valve to be returned to its normally open position and fluid pressure will pass through the valve to the chamber 34 of the head actuator 25 to advance the head. Also, the circuits to the solenoids 195 and 192 of the relays 165 and 168, respectively, will be broken simultaneously to de-energize the solenoids. When the solenoid 195 of the relay 165 has been de-energized the selected predetermined time to close interval of two seconds set for the relay 165 will begin to run. Simultaneously, therewith, the contact 167 of the relay 168 will be immediately returned to its normally closed position, when the solenoid 192 of the relay 168 has been de-energized. However, since the contact 164 of the relay 165 is still in the open position due to the time to close function of the relay 165, the primary energizing circuit to the coil of the solenoid 170 of the relay 171 will remain interrupted to maintain the relay inactive thereby maintaining the valve 66 open whereby the head 14 will be continued to be advanced. During the two second time interval between the de-energization of the solenoid 195 of the relay 165 and the return of the contact 164 to its normally closed position, exhaust fluid will pass through the valve and the drill head will be advanced at a feed rate. After the predetermined two second time interval set for the closing of the relay 165 has elapsed, the contact 164 therein will be returned to its normally closed position to again establish the primary energizing circuit to the solenoid 170 of the relay 171 to again energize the solenoid 91 of the valve 66 to move the plunger 88 into a block position thereby stopping the flow of fluid to the actuator 25 to stop the advancement of the head 14 and the cycle is repeated. It is apparent that with this arrangement, automatic periodic interruption of the advancement of the drill head 14 is accomplished with a resulting breaking of the continuity of the chips produced by the drills 17 and 18 in a work operation.

When the work operation has been completed the dog 114 will contact the switch 115 opening the contact 127 and closing the contact 201. Upon opening of the contact 127 in the switch 115 the primary circuit and the maintaining circuit to the coil of the solenoid 129 of the relay 130 will be interrupted to de-energize the relay and thereby return the contacts therein to an open position. Actuation of the switch 115 will also de-energize the relay 171, since the energizing circuit to the coil of the solenoid 170 of the relay 171 is dependent upon the contact 127 of the switch 115 being closed. Thus, the solenoid 91 of the valve 66 will be maintained de-energized permitting the plunger 88 of the valve to be maintained in its normally open position. When the relay 130 is de-energized the contacts 138 and 139 therein will be opened to de-energize the solenoid 50 of the valve 40 permitting the plunger 46 of the valve to return to its neutral position.

Upon the closing of the contact 201 in the switch 115 current from the transformer 120 will flow through lines 122, 140 and 141 through a conductor 202, the closed contact 201 of the switch 115, a conductor 203, a conductor 204 and a conductor 205 to the switch 117. The current will flow through the switch 117 via the now closed contact 206 therein, a conductor 207, and a conductor 208 to a switch 210. The current will continue through the switch 210 via a closed contact 211 therein, a conductor 212 through the coil of a solenoid 213 of a relay 215. The current will return to the secondary of the transformer 120 via a conductor 216 and the conductors 133, 134 and 135 to complete the circuit. Current flowing through the coil of the solenoid 213 will energize the solenoid to close the relay 215. When the relay is closed a maintaining circuit will be established for the solenoid 213 of the relay. In this respect current will flow from the current carrying conductor 143, through a conductor 217, a now closed contact 218 of the relay 215, a conductor 219, the conductors 204 and 205, through the switch 117 via the contact 206, and by conductors 207 and 208 through the switch 210 via the contact 211. From the switch 210 current will flow via the conductor 212 to the coil of the solenoid 213 of the relay 215 and return to the transformer via the conductors 216, 133, 134 and 135. The maintaining circuit just described will maintain the solenoid 213 of the relay 215 energized when the dog 114 is moved out of engagement with the switch 115.

With the relay 215 closed, a circuit will be completed to the solenoid 51 of the valve 40. Thus, current will flow from the conductor 142 and continue on via a conductor 222, a now closed contact 223 of the relay 215, a conductor 224 to the coil of the solenoid 51. From the coil current will return to the transformer 120 via a conductor 225, a now closed contact 226 of the relay 215, a conductor 227 and the conductors 155, 156, 157, 132, 133, 134 and 135 to complete the circuit. The solenoid 51 upon being energized will condition the valve 40 to direct fluid pressure to the chamber 53 of the actuator 25 to retract the drill head 14 at a rapid rate. When the head 14 is fully retracted to its normal start position the dog 116 will actuate the switch 117 to an open condition thereby breaking the circuit to the coil of the solenoid 213 of the relay 215 to de-energize the solenoid. When the relay 215 is de-energized the contacts therein will be moved to an open condition and de-energize the solenoid 51 of the valve 40 and the plunger 46 thereof will be returned to its normal position blocking the flow of fluid pressure to the actuator 25 to complete a cycle of operation.

Provisions have been made to enable the operator to move the drill head 14 to a tool change position either from the full advance position or from the normal start position. For example, assume that a cycle of operation has been initiated and it is desired that the drills 17 and 18 be replaced after a work operation has been completed. For this case the operator will turn a tool change selector switch 230 to an "on" position thereby closing a contact 231 within the switch. Upon completion of a work operation the head 14 will be retracted, and on reaching its normal start position will cause the switch 117 to be opened which would normally stop movement of the head, as previously described. However, with the selector switch 230 in the "on" position the switch 117 will be "shunted" and curent to the coil of the solenoid 213 of the relay 215 will be continued thereto to maintain the relay energized. Current will flow from the transformer 120 via the conductors 122, 140, 141, 142, 143 and 217 to the closed contact 218 of the relay 215. From the contact 218 of the relay 215 the curent will continue to flow through the conductors 219, 204 and 232 and thence through the contact 231 of the selector switch 230, a conductor 233, a conductor 234 to the conductor 208 and thence through the switch 210 via the closed contact 211 therein, to the conductor 212 and the coil of the solenoid 213 of the relay 215. The current will return to the secondary of the transformer 120 via the conductors 216, 133, 134 and 135 to complete the circuit to maintain the relay 215 energized. When the head has been retracted to the tool change position, a dog 235 on the head will actuate the switch 210 to open the contact 211 and de-energize the relay 215. After the tool change has been completed there is no need to return the head to its normal start position as a cycle of operation may be initiated with the head in the tool change position, in the normal manner.

In the case wheer the head 14 is in the normal start position and it is desired that the drills 17 and 18 be changed before initiating a cycle of operation, the head may be moved directly from the normal start position to the tool change position. To this end the operator will set the selector switch 230 to the "on" position and then actuate a tool change switch 237. Current will now flow from the conductor 140 through a conductor 238, the now closed contact 239 of the tool change switch 237, a conductor 240, the conductor 234, the conductor 208 to the switch 210. The current will continue on thruogh the normally closed contact 211 of the switch 210, the conductor 212 to the coil of the solenoid 213 of the relay 215 to energize the solenoid and actuate the relay 215 to close. The maintaining circuit for the solenoid 213 is established through the now closed contact 218 of the relay 215, the closed contact 231 of the selector switch 230 and the normally closed switch 210, as previously described. The maintaining circuit will keep the solenoid 213 of the relay 215 energized when the tool change switch 237 has been released. With the relay 215 being actuated to close the contacts therein the solenoid 51 of the valve 40 will be energized to condition the valve 40 to direct fluid pressure to the chamber 53 of the head actuator 25 moving the head to the tool change position.

Attention is directed to a condition of operation which if it existed could result in the elimination of the switch 101 and the dog 102. This condition would be one where the time of advancement of the head 14 at a rapid rate is less than the time interval set for operation of the relays 165 and 168. Thus, there would be no reason for maintaining the relays 165 and 168 inoperative until the head completed its approach travel for the advancement of the head at a rapid rate will have been completed before the relays operate. In this case the conductors 161 and 163 will be directly connected together and the relays 165 and 168 energized at the same time that the solenoids 50 and 91 are energized.

From the foregoing detailed description of the illustrative structure set forth herein to disclose the principles of this invention, it is apparent that there has been provided a novel control system for a movable member of a machine tool which is particularly adapted to control the movement of a drilling unit in an automatic cycle of operation and which is capable of controlling the member during a material removing operation so that the material removed in the form of chips are relatively small in size.

Although the illustrative embodiment of the invention has been described in considerable detail for the purpose of disclosing a practical operative structure whereby the invention may be practiced advantageously, it is to be understood that the particular apparatus described is intended to be illustrative only and that various novel characteristcs of the invention may be incorporated with other structural members without departing from the spirit and scope of the invention, as defined in the subjoined claims.

The principles of this invention having now been fully explained in connection with the foregoing description, we hereby claim as our invention:

1. In a power drive for driving a movable member to produce relative movement between a work support and a drilling tool support of a drilling machine for obtaining relative movement between a workpiece and the drilling tool to perform a drilling operation; a motor operably connected to move the movable member in its path of travel; a source of power connected to said motor for energizing it to produce the feeding movement of the member; control means operably connected to control the flow of power from said source through said motor, said control means being normally conditioned to allow the flow of power through said motor for effecting the feeding movement but actuatable to interrupt the flow of power through said motor for stopping the feeding movement; and automatic actuating means operably connected to periodically actuate said control means for intermittently interrupting the flow of power through said motor to effect a periodic stoppage of the feeding movement without withdrawing the drilling tool from the workpiece; whereby the interruption of the feeding movement serves to break the chips formed by the drilling tool during its operation upon the workpiece.

2. In a power drive for driving a movable member to produce relative movement between a work support and a drilling tool support of a drilling machine for obtaining relative movement between a workpiece and the drilling tool to perform a drilling operation; a motor operably connected to move the movable member in its path of travel; a source of power connected to said motor for energizing it to effect the movement of the movable member; a first control means operably connected to control the flow of power from said source through said motor; said first control means being normally conditioned to allow the flow of power through said motor for effecting the movement of the movable member but actuatable to interrupt the flow of power through said motor for stopping the movement of the movable member; a second control means operably connected to restrict the rate of the flow of power through said motor and said first control means to thereby restrict the operation of said motor to move the movable member at a feed rate; and automatic actuating means operably connected to periodically actuate said first control means for intermittently interrupting the flow of power through said motor to effect a periodic stoppage of the feeding movement of the movable member without withdrawing the drilling tool from the workpiece; whereby the interruption of the feeding movement serves to break the chips formed by the drilling tool during its operation upon the workpiece.

3. In a power drive for driving a movable member of a drilling machine to produce relative movement between a work support and a drilling tool to perform a drilling operation; a motor operably connected to move the movable member in its path of travel; a source of energy connected to said motor to energize it for operation in either direction selectively; a pair of conduits connected to said source and to said motor to form a circuit for carrying the energy to said motor to actuate it and returning the energy to said source; a flow restricting means operably connected in the circuit to restrict the rate of flow of said energy through the circuit to thereby restrict the rate of operation of said motor and effect movement of the movable member at a feed rate; interrupting means connected in the circuit and actuatable to interrupt the flow of energy through the circuit to thereby stop the operation of said motor; and actuating means operably connected to automatically actuate said interrupting means for a period at predetermined intervals during the advancement of the movable member at a feed rate to intermittently interrupt the flow of energy through said motor and thereby effect a periodic stoppage of the feeding operation of said motor; whereby the movement of the movable member of the drilling machine will be periodically interrupted during its advancing movement without withdrawing the drilling tool from the workpiece to break the chips that have been formed by the drilling tool.

4. In a power drive for producing movement of a machine tool member to perform a cutting operation; a hydraulic motor operably connected to move the member in its path of travel; a source of fluid pressure connected to said motor for actuating it in either direction selectively; a first conduit connected from said source to said motor to carry hydraulic pressure to said motor for operating it in a forward direction to advance the machine tool member, said first conduit serving as an exhaust line for carrying exhaust fluid from said motor to said source when said motor is operated in the reverse direction to retract the member; a second conduit connected from said source to said motor to carry hydraulic pressure to said motor for operating it in a reverse direction to retract the machine tool member, said second conduit serving as an exhaust line for carrying exhaust fluid from said motor to said source when said motor is operated in the forward direction to advance the member; a valve connected to said second conduit for controlling the flow of exhaust fluid through said second conduit, said valve being normally open so as not to interfere with the flow of exhaust fluid through said second conduit but being operable when actuated to interrupt the flow of exhaust fluid through said conduit to thereby stop the operation of said motor; and actuating means operably connected to automatically actuate said valve for a period at predetermined intervals during the advancement of the machine tool member to intermittently interrupt the flow of exhaust fluid in said second conduit and thereby effect a periodic stoppage of the operation of said motor; whereby the movement of the machine tool member will be periodically interrupted during its advancing movement to break the chips that have been formed by the machine tool cutter without withdrawing the cutter from the workpiece.

5. In a hydraulic transmission for controlling a movable member of a machine tool; a reciprocating motor connected to advance and retract the member; a source of fluid pressure connected to the motor to energize it; a first valve connected between said motor and said source and operable to selectively direct the fluid pressure from said source to one end of said motor to advance the member or to the other end of said motor to retract the member, said first valve being normally biased in a neutral condition to block the flow of fluid pressure to said motor and conditionable to one or the other of two operative positions to effect selective actuation of said motor to advance or retract the member; a second valve connected to receive the fluid exhaust from said motor when said motor has been actuated to advance the member, said second valve being normally biased to permit of flow of exhaust fluid therethrough and conditionable to an operative position to block the flow of fluid therethrough to stop the operation of said motor; a third valve connected to receive the fluid exhaust from said second valve, said third valve being normally biased to permit the flow of fluid therethrough and conditionable to a closed position to block the flow of fluid through it; a first means connected to condition said first valve to direct fluid pressure to said motor to advance the member; second means operable when actuated to close said second valve to block the flow of fluid exhaust therethrough including means operably connected to interrupt the operation of said second means periodically for predetermined intervals to open said second valve and thereby effect incremental advancement of the movable member; third means operably connected to render said first and second means inoperative and to condition said first valve to its other operative position to direct fluid pressure to said motor to retract the member when the member has been advanced to a selected position; and fourth means connected to render said third means inoperative upon retraction of the member to a predetermined position and thereby permit said first valve to assume its neutral position to terminate the flow of fluid pressure to said motor; whereby the advancing movement of the member is periodically interrupted and when the member has been advanced to a selected position retraction of the member to its original starting position is accomplished.

6. In a control system for controlling the movement of a cutter carrying machine tool member; a hydraulic motor operably connected to move the member in its path of travel; a source of fluid pressure connected to said motor for actuating it in either direction selectively; a first conduit connected from said source to said motor for carrying hydraulic pressure to said motor for operating it in a forward direction to advance the member, said first conduit serving as an exhaust line for carrying exhaust fluid from said motor to said source when said motor is operated in the reverse direction to retract the member; a second conduit connected from said source to said motor to carry hydraulic pressure from said source to said motor to operate it in a reverse direction to retract the member, said second conduit serving as an exhaust line for carrying exhaust fluid from said motor to said source when said motor is operated in the forward direction to advance the member; a first valve connected to said second conduit for controlling the flow of exhaust fluid through said second conduit, said valve being normally open so as not to interfere with the flow of exhaust fluid through said second conduit but being operable when actuated to interrupt the flow of exhaust fluid through said second conduit to thereby stop the operation of said motor; a second valve connected to said second conduit between said first valve and said source to block the flow of exhaust fluid from said first valve to said source, said second valve being normally open so as not to interfere with the flow of exhaust fluid through said second conduit but being operable when actuated to block the flow of exhaust fluid from said first valve to said source, said second valve being operable in response to the advancement of the member to a predetermined position; a metering valve connected to said second conduit between said first valve and said source to by-pass said second valve when said second valve is operated to block the flow of exhaust fluid from said first valve to said source, said metering valve thereby serving to control the rate at which the member is advanced; and actuating means operably connected to automatically actuate said first valve for a period at predetermined intervals during the advancement of the machine tool member at the control rate to intermittently interrupt the flow of exhaust fluid through said first valve and thereby effect a periodic stoppage of the operation of said motor; whereby the movement of the machine tool member will be periodically interrupted during its advancing movement at the controlled rate to cause chips that may have been formed by the machine tool cutter to break.

7. In a hydraulic control system for controlling the operation of a cutter carrying member of a machine tool; a fluid actuator connected to advance or retract the movable member selectively; a source of fluid pressure connected to said fluid actuator to energize it; a first valve connected between said source and said actuator normally biased to block the flow of fluid pressure to said actuator, said first valve having a first electrical means operably connected to condition said first valve to a first operative condition wherein it directs fluid pressure to said fluid actuator to advance the movable member, said first valve also having a second electrical means operably connected to condition said first valve to a second operative condition wherein it directs fluid pressure to said fluid actuator to retract the movable member; a second valve connected to receive exhaust fluid from said fluid actuator when said actuator is supplied with fluid pressure to advance the movable member, said second valve being normally biased to an open condition to permit a flow of fluid therethrough; a third electrical means connected to said second valve and operable to condition said second valve to a closed condition; a source of electrical energy connected to said first, second and third electrical means; a first switch connected to said first electrical means and actuatable to effect operation of said first electrical means to thereby condition said first valve to direct fluid pressure to said actuator to advance the movable member; a second switch connected to said third electrical means and operable in response to the advancement of the movable member to a selected position to effect operation of said third electrical means thereby conditioning said second valve to block the flow of exhaust fluid therethrough to stop the movable member; a third switch; a fourth switch; said third and fourth switches being connected in series with said third electrical means and automatically operable intermittently for selected time intervals to interrupt the connection between said source of electrical energy and said third electrical means to thereby permit of the advancement of the movable member during the selected time intervals; a fifth switch connected to said first electrical means and to said third electrical means and operable in response to the advancement of the movable member to a selected position to interrupt the connection between said source of electrical energy and said first electrical means and said third electrical means, said fifth switch also being operable to effect operation of said second electrical means to thereby effect a conditioning of said first valve to its second operative condition to direct fluid pressure to said fluid actuator to retract the movable member; a sixth switch operable in response to the retraction of the movable member to its initial position to interrupt the connection between said source of electrical energy and said third electrical means to permit said first valve to return to its normal block condition to thereby stop movement of the movable member; whereby the movable member will be advanced and the advancement of the movable member will be intermittently interrupted for selected time intervals to thereby effect a breaking of chips formed by the cutter of the movable member and the movable member upon being advanced to a selected position will be retracted to its initial position.

8. In a hydraulic control system for controlling the operation of a cutter carrying movable member of a machine tool; a fluid actuator connected to advance or retract the movable member selectively; a source of fluid pressure connected to said fluid actuator to energize it; a first valve connected between said fluid actuator and said source and normally biased in a blocking condition to block the flow of fluid pressure to said actuator, said first valve being conditionable to a first operating condition to direct the flow of fluid pressure to said fluid actuator to advance the movable member or to a second operating condition to direct the flow of fluid pressure to said fluid actuator to retract the movable member; a second valve connected to receive exhaust fluid from said fluid actuator when said actuator is energized to advance the movable member, said second valve normally biased to permit a flow of fluid therethrough and conditionable to block the flow of fluid therethrough; a metering valve connected to receive exhaust fluid from said second valve to control the rate of advancement of the movable member; a first means operably connected to condition said first valve to its first operating condition to thereby direct fluid pressure to said actuator to advance the movable member; a second means operably connected to condition said second valve to block the flow of exhaust fluid therethrough to stop the advancement of the movable member; third means operably connected to render said second means ineffective intermittently thereby permitting said second valve to return to its normal open condition allowing exhaust fluid to flow through said valve to said metering valve to advance the movable member at the controlled rate during the intervals that said second means is ineffective; fourth means operably connected to render said second means inoperative and connected to condition said first valve to its second operating condition to direct fluid pressure to said actuator to retract the movable member; and fifth means operably connected to render said fourth means inoperative to permit the return of said first valve to its normal block condition thereby stopping the movement of the movable member; whereby said movable member is advanced at a controlled rate and the advancement of the movable member is intermittently interrupted to effect a breaking of the chips produced by the cutter of the movable member.

9. In a hydraulic control system for controlling the operation of a cutter carrying movable member of a machine tool; a fluid actuator connected to advance or retract the movable member selectively; a source of fluid pressure connected to said fluid actuator to energize it; a first valve connected between said fluid actuator and said source and normally biased in a blocking condition to prevent the flow of fluid pressure to said actuator, said first valve being conditionable to a first operating condition to direct fluid pressure to said actuator to advance the movable member or to a second operating condition to direct fluid pressure to said actuator to retract the movable member; a second valve connected to receive exhaust fluid from said actuator when said actuator is energized to advance the movable member, said second valve being normally biased in an open condition to permit a flow of exhaust fluid therethrough, said second valve also being conditionable to block the flow of exhaust fluid; a first means operably connected to condition said first valve to its first operating condition to direct fluid pressure to said fluid actuator to advance the movable member; a second means operably connected to said second valve to condition said second valve to its blocking condition thereby stopping the advancement of the movable member; third means operably connected to render said second means periodically inoperative to permit said second valve to be conditioned to its normal open condition during the interval that said second means is rendered inoperative to thereby advance the movable member during the interval that said second means is inoperative; a fourth means operably connected to render said second means inoperative and to condition said first valve to its second operating condition to direct the flow of fluid pressure to said fluid actuator to retract the movable member; and a fifth means operably connected to render said fourth means inoperative thereby permitting said first valve to return its normal blocking condition to stop the flow of fluid pressure to said actuator and thereby stop the movement of said movable member; whereby the cutter carrying movable member is advanced and the advancement of the movable member is periodically intermittently interrupted to thereby effect a breaking of chips produced by the cutter of the movable member.

10. In a control system for controlling the movement of a movable member of a machine tool; a hydraulic motor for advancing or retracting the member; a source of fluid pressure connected to the motor; a first valve connected between said motor and said source to control the operation of said motor, said first valve being normally conditioned to maintain said motor inoperative and being actuatable to direct the fluid pressure to said motor to effect its operation in a forward or reverse direction to advance the movable member or to retract the member; a second valve connected to receive the fluid exhaust from said motor when said motor is energized to advance the member, said second valve being normally in an open condition to permit the flow of fluid therethrough and conditionable to a closed position to block the flow of fluid and thereby stop the operation of said motor; a third valve connected to receive the fluid exhaust from said second valve, said third valve being normally in an open condition to permit the flow of fluid therethrough for effecting movement of the member at a rapid rate and conditionable to a closed position to block the flow of fluid; a metering valve connected to receive the fluid exhaust from said second valve and thereby effect movement of the member at a reduced rate when said third valve has been closed to block the flow of fluid from said second valve therethrough; first means connected to said first valve and actuatable to condition said valve to direct fluid pressure to said motor for operation in a direction to advance the member, said first means being also connected to condition said second valve when actuated to block of the flow of fluid exhaust therethrough; a first control means operably connected to effect conditioning of said third valve to block the flow of fluid therethrough and operable in response to the advancement of the member to a predetermined position; other control means connected to periodically interrupt the conditioning effect of said first means on said second valve to thereby effect intermittent movement of the member; a second control means connected to effect conditioning of said first valve to direct fluid pressure to said motor to operate said motor in a direction to retract the member and operable in response to the advancement of the member to another predetermined position, said second control means being also operative to render said first means and said first control means inoperative; and a third control means connected to render said second control means inoperative to thereby condition said first valve to its normal condition to block the flow of fluid pressure to said motor and thereby terminate the movement of the member, said third control means being operable in response to the retraction of the member to a selected position.

11. In a hydraulic transmission for controlling the operation of a cutter carrying movable member of a machine tool; a fluid motor connected to advance or retract the movable member selectively; a source of fluid pressure connected to said motor to energize it; a first valve connected between said fluid motor and said source, said first valve being normally conditioned to block the flow of fluid pressure to said fluid motor and conditionable to a first or a second operative position in which it directs fluid pressure to said fluid motor in a direction to advance the movable member or to said fluid motor in a direction to retract the movable member; a second valve connected to receive exhaust fluid from said fluid motor when said motor is energized to advance the movable member, said second valve being normally conditioned to permit the flow of exhaust fluid therethrough and conditionable to a closed position to block the flow of exhaust fluid from said motor when actuated to stop said motor and thereby the advancement of the movable member; a third valve connected to receive the exhaust fluid from said second valve, said third valve being normally conditioned to permit the flow of exhaust fluid therethrough to effect a rapid rate of travel of the movable member and conditionable to block the flow of exhaust fluid when actuated; a metering valve connected to receive exhaust fluid from said second valve when said third valve has been closed to block the flow of exhaust fluid to thereby control the rate at which said movable member is advanced; a first means operably connected to condition said first valve to direct fluid pressure to said fluid motor to effect advancement of the movable member; a first dog adjustably secured to the movable member in position to actuate said third valve at a predetermined time during the advancement of the movable member to close said third valve to block the flow of exhaust fluid received from said second valve and thereby direct the exhaust fluid from said second valve to said metering valve to reduce the rate at which the movable member is advanced; a second means operably connected to said second valve and operable when actuated to close said valve and thereby block the flow of exhaust fluid therethrough to thereby effect a stoppage in the advancement of the movable member, said second means being normally maintained inoperative and actuatable to an operating condition; a second dog adjustably secured to the movable member in position to actuate said second means to close said second valve; other means operably connected to said second means when said second means has been actuated to its operative condition to periodically interrupt the conditioning of said second valve to its closed position to thereby effect intermittent advancement and stopping of the movable member; third means operably connected to said first valve to condition said valve to its other operative position to effect a retraction of the movable member when actuated, said third means being normally maintained in an inoperative condition and actuatable to an operative condition, said third means when actuated to its operative condition being also effective to render said first and second means inoperative; a third dog adjustably secured to the movable member in position to actuate said third means to its operative condition when the member has been advanced to a selected position; a fourth means operable when actuated to render said third means ineffective thereby conditioning said first valve from its other operative position to its normal position to block the flow of fluid pressure to said motor when actuated; and a fourth dog adjustably secured to the movable member in position to actuate said fourth means when the movable member has been retracted to its normal position; whereby said cutter carrying movable member is advanced at a relatively fast rate and at a predetermined point in the advancement of the cutter carrying movable member the rate at which it is advanced is automatically reduced to a relatively slower rate with periodic stoppages of movement of the cutter carrying movable member during the interval of advancement at the relatively slower rate to thereby break the chips formed by the cutter of the movable member and upon reaching a predetermined point of advancement said cutter carrying movable member will be automatically retracted to its initial start position.

12. In a hydraulic transmission for a movable member of a machine tool which includes a reciprocating motor for advancing or retracting the member selectively and a source of fluid pressure connected to the motor to energize it; a first valve connected between said motor and said source to control said motor, said valve being biased to a neutral condition to block the flow of fluid pressure to said motor and being conditionable to a first or a second operative position selectively in which it directs fluid pressure to one or the other end of said motor; a first magnetic device connected to said first valve and operable when energized to condition said valve into said first operative position; a second magnetic device connected to said first valve and operable when energized to condition said valve into said second operative position; an electrical circuit for energizing said first magnetic device; a second valve connected to receive exhaust fluid from said motor when said motor is advancing said member, said second valve being normally biased to permit the flow of exhaust fluid therethrough and being conditionable to block the flow of exhaust fluid from said motor when said motor is being supplied with fluid pressure to advance the movable member to thereby stop the advancement of the movable member; a third magnetic device connected to said second valve and operable when energized to condition said second valve to block the flow of exhaust fluid therethrough; a second electrical circuit for energizing said third magnetic device including a first switch normally biased to maintain said circuit open and positionable when actuated to complete the circuit to said third magnetic device; a third valve connected to receive exhaust fluid from said second valve, said third valve being normally biased to permit of flow of the exhaust fluid therethrough and conditionable to block the flow of exhaust fluid when actuated; a metering valve connected to receive the exhaust fluid from said second valve when said third valve has been actuated to block the flow of exhaust fluid; a first dog on said member in position to actuate said third valve when said member has been moved a predetermined amount to block the flow of exhaust fluid therethrough and thereby direct the exhaust fluid through said metering valve to thereby reduce the rate at which said movable member is advanced; a second dog on said movable member in position to actuate said first switch to thereby complete the circuit to said third magnetic device to energize it and condition said valve to block the flow of exhaust fluid; electrical means in said second electrical circuit to effect periodic energization and de-energization of said third magnetic device during the advancement of the member at the reduced rate; a third electrical circuit for energizing said second magnetic device including a third switch normally biased in one position which is included in the electrical circuits of said first and third magnetic devices and movable to a second position to complete the circuit to said second magnetic device and to interrupt the electrical circuits of said first and third magnetic devices when actuated; a third dog on said movable member in position to actuate said third switch when said member has been advanced to its limit of travel as defined by the position of said third dog on the movable member to de-energize said first and third magnetic devices to permit of the conditioning of said first and second valves to their normal condition and to energize said second magnetic device to condition said first valve to the second of its two operative positions to direct fluid pressure to the motor to retract the movable member; a fourth switch connected into the electrical circuit of said second magnetic device, said fourth switch being normally biased in a position to maintain said circuit to said second magnetic device complete and movable to a position to interrupt the circuit thereto when actuated; and a fourth dog on the member in position to actuate said fourth switch when said member has been retracted to its normal start position to thereby de-energize said second magnetic device to condition said first valve to its normal position to block the flow of fluid pressure to said motor; whereby said movable member may be advanced at a relatively fast rate and at a predetermined point the advancement of the movable member will be reduced to a relatively slower rate for a predetermined interval with periodic stoppages of the movement of the movable member during the interval of advancement at the relatively slower rate and said movable member will be retracted to its initial position after being advanced to a predetermined point.

13. In a control system for a cutter carrying movable member of a machine tool; a hydraulic actuator connected to reciprocate the movable member; a source of fluid pressure; a hydraulic circuit connected to said source and to said hydraulic actuator; a distribution valve in said hydraulic circuit normally biased in a blocking condition and operable when actuated to a first condition to direct fluid pressure to said hydraulic actuator to advance the cutter carrying movable member, said distribution valve being also operable when actuated to a second condition to direct fluid pressure to said hydraulic actuator to retract the movable member; first electrical means connected to said distribution valve to actuate said valve to its first condition when energized; a second electrical means connected to said distribution valve to actuate said valve to its second condition when energized; a second valve in said hydraulic circuit connected to receive exhaust fluid from said hydraulic actuator when said distribution valve has been actuated to its first condition directing fluid pressure to said hydraulic actuator to advance the movable member, said second valve being normally biased in an open condition and operable when actuated to block the flow of exhaust fluid therethrough; a third electrical means connected to said second valve to actuate said second valve into its blocking condition when energized; a third valve in said hydraulic circuit connected to receive exhaust fluid from said hydraulic actuator after the exhaust fluid has passed through said second valve, said third valve being normally biased in an open condition to effect a rapid rate of travel of said cutter carrying movable member and operable when actuated to block the flow of exhaust fluid therethrough; a metering valve in said hydraulic circuit connected to receive exhaust fluid from said second valve when said third valve has been actuated to block the flow of exhaust fluid therethrough; a source of electrical energy; an electrical circuit connected to said source and to said first and second electrical means of said distribution valve, said electrical circuit also connected to said third electrical means of said second valve; a first switch in said electrical circuit normally conditioned to interrupted the electrical circuit to said first electrical means of said distribution valve and to said third electrical means of said second valve, said first switch operable when actuated to complete the electrical circuit to said first electrical means of said distribution valve to energize said first electrical means to thereby direct fluid pressure to said hydraulic actuator to advance the cutter carrying movable member; a first dog adjustably mounted on said cutter carrying movable member in position to actuate said third valve at a predetermined time thereby directing the flow of exhaust fluid to said metering valve; a second switch in said electrical circuit operable when actuated to energize said third electrical means of said second valve to actuate said second valve to its blocking condition thereby stopping the advancement of the cutter carrying movable member; a second dog adjustably mounted on said cutter carrying movable member in position to actuate said second switch at a predetermined time; other electrical means in said electrical circuit operable automatically to periodically interrupt the electrical circuit to said third electrical means of said second valve to de-energize it and thereby permit said second valve to be biased to its open condition to permit the flow of exhaust fluid through said second valve thereby permitting the cutter carrying movable member to be advanced; whereby said cutter carrying movable member is advanced at a rapid rate and at a predetermined time the advancement of said movable member is restricted to a relatively slower rate and the advancement of the movable member at the relatively slower rate is periodically interrupted to effect a breaking of the chips produced by the cutter of the movable member; a third switch in said electrical circuit operable when actuated to interrupt the electrical circuit to said first electrical means of said distribution valve and to said third electrical means of said second valve to de-energize them thereby permitting said distribution valve and said second valve to be returned to their normal condition, said third switch also operable when actuated to energize said second electrical means of said distribution valve to actuate said valve to its second condition to direct the flow of fluid pressure to said hydraulic actuator to retract the cutter carrying movable member; a third dog adjustably mounted on said cutter carrying movable member in position to actuate said third switch at a predetermined time; a fourth switch in said electrical circuit operable when actuated to interrupt the electrical circuit to said second electrical means of said distribution valve to de-energize it and permit said valve to be biased to its normal blocking condition thereby stopping the flow of fluid pressure to said hydraulic actuator; and a fourth dog adjustably mounted on said cutter carrying movable member in position to actuate said fourth switch when said cutter carrying movable member has been retracted to its start position.

14. In a control system for a movable member of a machine tool having relatively movable workpiece and cutting tool carrying members; a motor operably connected to effect relative feeding movement between the members; a source of power connected to energize said motor; and automatic means connected to intermittently interrupt the operation of said motor to periodically interrupt the relative feeding movement between the members while maintaining the relative position between the members as established by the feeding operation of said motor and thereby break the chips formed by the cutting tool operating upon the workpiece.

15. In a power drive for driving a movable member of a machine to produce relative movement between a work support and a tool support and corresponding relative movement between a workpiece and a tool in performing a machining operation; a reversible motor operably connected to selectively move the member in a predetermined path of travel; an energizing circuit connected to said motor; interrupting means connected in said circuit and actuatable to interrupt the flow of energy through said circuit to thereby stop the operation of said motor; and actuating means operably connected to automatically actuate said interrupting means at predetermined intervals during the advancement of the movable member and thereby effect periodic interruption in movable member advancement as the energization of said motor is continued to retain the movable member in any advanced position; whereby advancement of the machine member will be periodically interrupted to effect breakage of chips formed during the machining operation without withdrawing the tool from the workpiece.

16. In a power drive for driving a movable member of a machine to produce relative movement between a work support and a tool support and corresponding relative movement between a workpiece and a tool in performing a machining operation; a motor operably connected to move the member in a predetermined path of travel; a source of power connected to energize said motor to effect advancing movement of the member; control means operably connected to control the rate of advancement of the member by restricting the flow of power through said motor; and automatic means connected to intermittently interrupt the flow of power through said motor to effect periodic interruption of member advancement as the supply of power is continued to said motor to retain the member in any advanced position; whereby movement of the movable member of the machine at a controlled rate will be periodically interrupted to effect breakage of chips formed by the tool during operation upon the workpiece without withdrawal of the tool from the workpiece.

References Cited in the file of this patent
UNITED STATES PATENTS 2,324,727     Shartle _____ July 20, 1943